Oct. 20, 1970

D. A. BROWN ET AL 3,535,218

PROCESS FOR RECOVERING COPPER FROM LEACH LIQUOR

Filed Sept. 26, 1967

INVENTORS
DONALD A. BROWN
BY GEORGE W. LEECH
Cushman, Darby & Cushman
ATTORNEYS

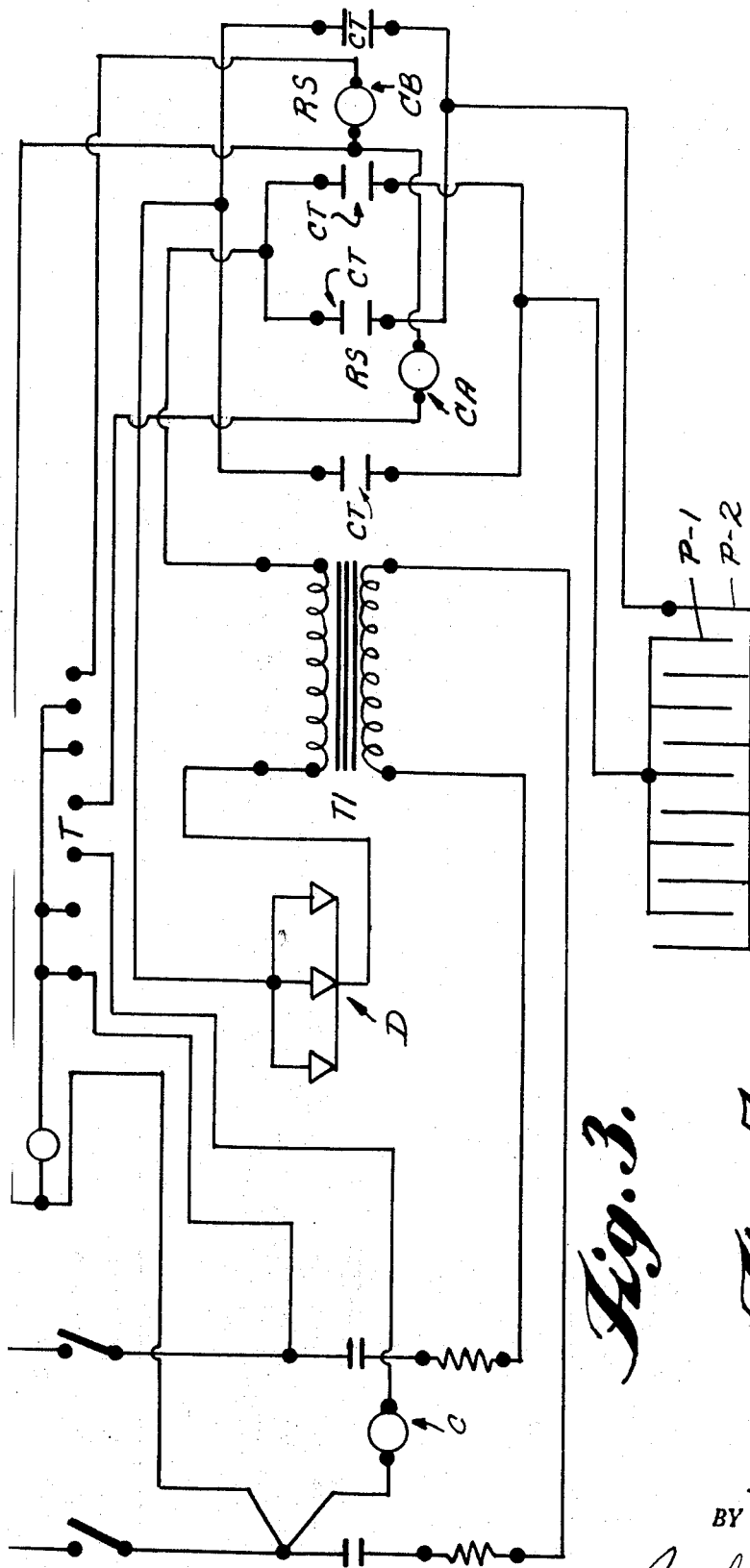
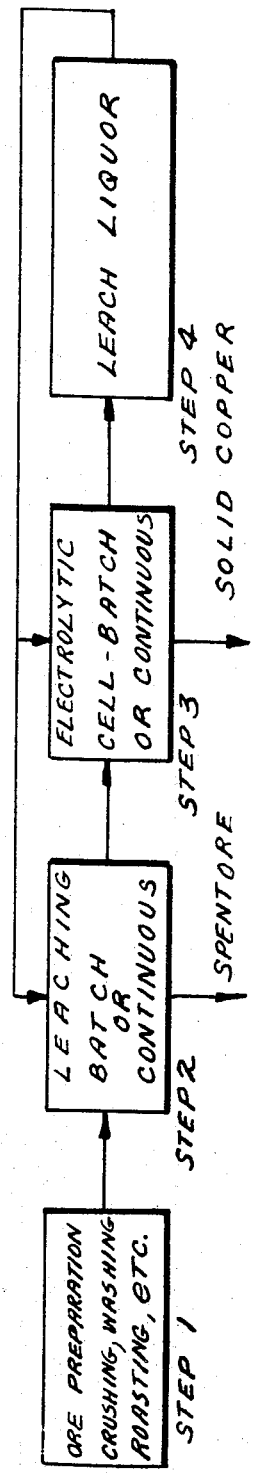
Fig. 3.
Fig. 4.
INVENTORS
DONALD A. BROWN
BY GEORGE W. LEECH
Cushman, Darby & Cushman
ATTORNEYS United States Patent Office
3,535,218
Patented Oct. 20, 1970

3,535,218
PROCESS FOR RECOVERING COPPER
FROM LEACH LIQUOR
Donald A. Brown, Box 537, Lakeside, Ariz. 85929, and
George William Leech, Box 282, Whiteriver, Ariz.
85941
Filed Sept. 26, 1967, Ser. No. 670,595
Int. Cl. C22d 1/16, 5/00
U.S. Cl. 204—108
6 Claims

ABSTRACT OF THE DISCLOSURE

There is provided a process and apparatus for electrolytically precipitating copper dissolved from ores and the like wherein the precipitation is accomplished with a pulsating direct current. The direct current supplied to the anode and cathode is periodically reversed in polarity with respect to the anode and cathode whereby the previous anode becomes the cathode and the previous cathode becomes the anode. Upon reversal of the polarity, the copper precipitated on the previous cathode falls off of the then functioning anode. There is also provided an improved electrolyte for use in the process containing sulfuric acid with a minor amount of lead dissolved therein.

---

This invention relates to processes and apparatus for electrowinning and electrorefining of copper, and more particularly relates to the electrolysis operation of such processes and apparatus for use therein.

It is well known that copper may be recovered from ores or crude copper by electrolytic precipitation. While the particular details of the various processes in use today vary depending on the quality and type of ore or crude copper as well as economical plant construction and power cost, the central step of such processes is the electrolytic precipitation of the dissolved copper. Since the present invention relates particularly to this central step, all of the variations and particular details of the many processes for which the present invention is applicable, will not be described in detail but described and explained in relation to the more common processes. However, it is to be understood that the invention may be practiced with any of the electrowinning or electrorefining processes. Even more particularly, the invention will be described in connection with electrowinning processes, but it will be readily apparent that the invention is equally applicable to electrorefining processes.

In electrowinning processes the copper ore is leached in large tanks which are generally made of concrete and which may be optionally lined with mastic, lead, plastic and other acid resistant materials. However, wooden, glass and acid resistant metal tanks may be used. The leaching liquid is generally sulfuric acid which may optionally contain minor amounts of additive such as glue and other viscosity controlling agents, as well as ingredients useful with particular ores. For example, iron may be added to the sulfuric acid to form a $H_2SO_4$—$Fe_2(SO_4)_3$ solution and is particularly useful with mixed oxide and sulfide copper ores. Often the iron is obtained from detinned tin-plate scrap such as conventional "tin" cans. The leaching operation may be carried out in one or more steps and may be preceded by a water washing to first remove water soluble minerals. The leaching step may be a batch operation with a definite soaking period or continuous with the leaching liquor being moved through a bed of ore. However, for purposes of this invention, the leaching may be carried out as desired, since the only necessary consideration is that of dissolving as much copper as possible in the most economical way. The leaching liquid, pregnant with dissolved copper, is generally filtered, decanted or otherwise processed to remove a substantial portion of insolubles, such as mud. Commonly, the pregnant liquor is dechloridized by means well known in the art, after the removal of insolubles. While other treatments of the ore and liquor may be performed, depending on the particular ore and process, such as crushing and roasting the ore, concentrating the liquor, etc. the liquor from which the insolubles have been removed is substantially in condition of electrolysis.

The electrolytic precipitation step is quite similar, whether performed as an electrowinning process or an electrorefining process, the major difference being that soluble anodes are normally used in the latter process. In the electrowinning process the insoluble anodes are normally made of alloys of copper, silicon, iron and lead with small amounts of tin and other metals. However, other anodes such as antimony-lead anodes are also commonly used. The pregnant leach liquor is passed into tanks, referred to as cells, which may be similar in construction to the leach tanks. A D.C. current with a voltage of 1 to 5 volts between the cathode and anode is supplied. The copper is precipitated on the cathode in relatively pure form. The temperature of the electrolytic cells is normally maintained between 20° and 50° C. and the current density of the electrodes is normally maintained between 10 and 40 amps/sq. ft.

While the above described processes are explained in general as background information, the more particular details are well known in the art. See Mantell, Industrial Electrochemistry, McGraw-Hill Book Co., New York, N.Y., 3d ed., pages 268–293 and 333–347, and U.S. Pat. 3,262,870, which disclosures are hereby incorporated by reference.

The known electrolytic precipitation processes and apparatus suffer, however, from common disadvantages. Most notably, the copper precipitated on the cathode is more or less tightly adhered thereto, and periodically the process must be discontinued and the cathodes scraped and/or replaced. This results in an uneconomical use of the process equipment and requires many valuable man-hours of labor. While many attempts have been made in the art to eliminate this problem, such as coating the cathodes with various coatings and release agents, none have been satisfactory and in addition, tend to place unwanted impurities in the copper. Furthermore, as the amount of copper adhering to the cathode increases, the efficiency of the electrolytic cell decreases and results in greater cost of operation. There is, therefore, a long-felt need in the art for a process by which the electrolytic precipitation of copper may be carried out in a continuous manner and without the necessity of frequent interruption of the process.

It is therefore an object of this invention to provide a process and apparatus that may be continuously operated, which will maintain high cell efficiency and eliminate the wasteful process stoppage and cathode scraping and/or replacement. It is a further object to provide a process with a favorable ratio of copper precipitated to power consumed and which will produce a copper precipitate of high purity. Other objects will be apparent from the following disclosure and claims.

Briefly stated, the present invention provides a process and apparatus for electrolytic precipitation of copper wherein the precipitating current is a pulsating direct current and the electrodes previously functioning as the cathode and anode are periodically caused to function as the opposite electrode, i.e., the cathode becomes the anode and the anode becomes the cathode. As a result of the pulsating direct current very pure copper precipitates on the cathode, and upon reversing the cathode to become the anode, the precipitated copper drops off of the previous cathode (now the anode) while additional copper is being precipitated on the previous anode (now the cathode).

While many conducting materials may be used as the electrodes of this process with some degree of success, it has been found that electrodes constructed of non-magnetic materials provide better results and are less subject to deterioration. In particular, stainless steel type materials give far better results than any other materials.

For purposes of this invention stainless steel type material is meant to encompass those alloys having major proportions of iron and chromium and iron, chromium and nickel. The percent of chromium may be as low as 3 percent or lower or as high as 30 percent or greater. Preferably, the stainless steel should contain at least 12% chromium and more preferably about 18% chromium or greater. The nickel content may be as low as 2%, but at least 6% or 7% is preferred. Other minor amounts of components may be included in the stainless steel type material contemplated, such as molybdenum and silicon. Examples of suitable stainless steel type materials are 301, 304, 316, 403 and 416 stainless steel. In general, the optimum stainless steel type material will depend on the oxygen and hydrogen content of the pregnant leach liquor, as well as the concentration of sulfuric acid therein and temperatures of liquor. A suitable material may easily be chosen by simple standard corrosion test using the contemplated pregnant leach liquor. However, for most applications, it has been found that 316 stainless steel is the preferred material.

The voltage and current density used in accordance with this invention is not critical, but generally the voltage will be between 1 and 6 volts and the current density will be between 10 and 60 amps/sq. ft. A preferred set of conditions is that of about 2.75 to 4.5 volts and about 20–40 amps/sq. ft. current density.

The concentration of sulfuric acid and dissolved copper in the leach liquor is also not critical and may vary widely. The sulfuric acid content may be as low as 5 grams per liter or lower up to as high as 400 grams per liter or greater. The dissolved copper content of the leach liquor may be from as low as 10 grams per liter or lower up to any concentration economically feasible. Representative amounts of dissolved copper will be between 25–70 grams per liter of leach liquor.

The temperature of the pregnant leach liquor in the electrolyltic precipitation step may range widely and from 10°–90° C. would be suitable. However, a temperature of about 20°–50° C. is preferred and about 40° C. is an excellent operating temperature.

Turning now to the drawings wherein:

FIG. 3 is an alternate circuit; and

FIG. 4 is an overall schematic plan of an illustrated process using the present invention.

Figure 1:
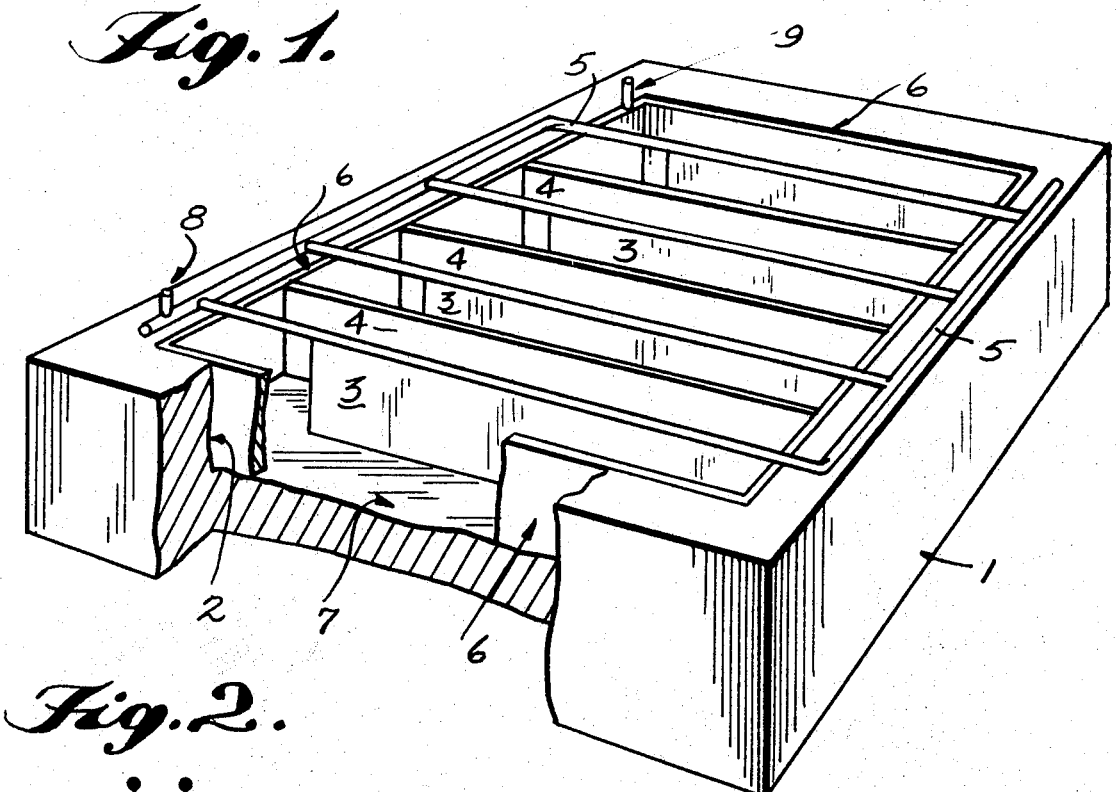
FIG. 1 is a diagrammatic illustration of a suitable electrolytic cell.

Referring to FIG. 1, there is shown a cell tank 1 illustrated as a concrete tank, which may have a protective inside surface 2. Disposed in the cell are anode plates 3 and cathode plates 4, supported by the anode bus bars 5 and cathode bus bar 6. The plates may be supported by the bus bar in any conventional fashion such as by bolting, clamping, slots and studs. The only necessary considerations are those of rigidity and good electrical contact.

The anode and cathode plates may be any desired size or configuraion, but a rectangular shape is most convenient. The plates are disposed above the bottom of the cell 7, so that there is some clearance therebetween, preferably several inches or more. The space between the plates is not critical, but from 1 to 5 inches is especially suitable. The bus bars have suitable terminal lugs 8 and 9 for attaching electrical cables thereto. Of course, any suitable device for attaching the electrical cables may be used. In operation, the pregnant liquor is pumped into the cell by any suitable means (not shown) such as pipes and hoses either above, in or under the tank. The pregnant liquor may be pumped into and out of the tank batchwise or pumped continuously in and out of the tank to provide a continuous operation. The copper which drops to the bottom of the tank also may be removed batchwise by flushing through a drain (not shown) or scooped or otherwise, or may be continuously removed by a traveling belt, scoops or continuously drained out by a bottom drain or otherwise.

The temperature of the pregnant liquor may be maintained by heating the incoming liquor, the tank or both. Other means of heating will be readily apparent to one skilled in the art.

Figure 2:
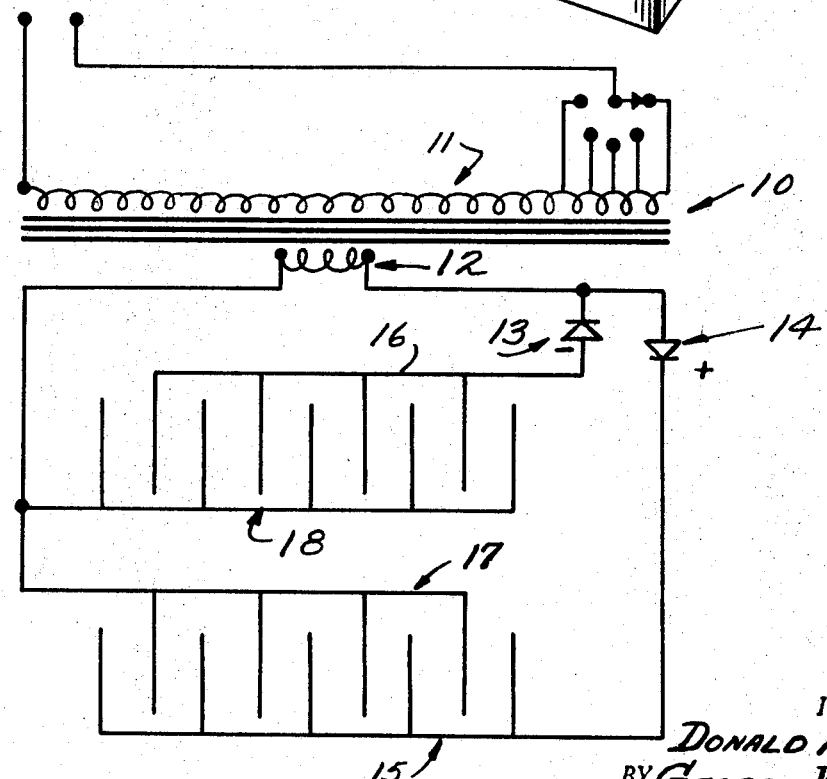
FIG. 2 is a diagram of a suitable circuit according to the present invention.

In FIG. 2, there is shown a suitable method of obtaining a pulsating direct current according to the present invention. Alternating current generated by any conventional generating machinery and of any desired voltage and cycles per second is supplied to a conventional step-down transformer, generally designated as 10, having a primary coil 11, and a secondary coil 12. If the voltage generated is chosen in connection with the particular step-down transformer any desired voltage may be obtained in the secondary coil 12. Of course, rheostats and like devices may also be used to control the voltage, if desired. One side of the step-down transformer is connected in parallel with a pair of diodes 13 and 14 or like rectifying devices which allow current to pass in opposite directions, whereby pulsating direct current of opposite polarity is directed to the anode 15 and cathode 16. In FIG. 2, diode 14 is illustrated as a positive current passing diode while diode 13 is illustrated as a negative current passing diode. The other side of the step-down transformer is connected to the opposite electrodes 17 and 18. While the process of this invention may be operated with only one diode, or a number of diodes all of which are hooked in parallel, this arrangement utilizes only one-half of the alternating current, and it is more efficient to use an arrangement as illustrated in FIG. 2 where at least one pair of diodes are provided and wherein the two diodes pass opposite polarity current, so as to utilize all of the alternating current. Furthermore, a series of cells may be hooked onto the electrical cables carrying the pulsating direct current, providing a bank of cells in parallel.

In practice, a switching device, many of which are known to the art, is attached at any convenient place in the circuit to reverse the polarity of the plates in the cell.

For example, such a device could be placed just after the diodes 13 and 14. Or if preferred, the cables connecting the diodes and plates could be manually reversed by hand. Also, in practice, a timer is placed in the circuit in conjunction with the switching device whereby the length of time that one set of plates functions as the cathode and then alternately as the anode may be controlled. Many such timing devices are known to the art.

An illustration of a suitable device as discussed above, is shown in FIG. 3. In this figure there is shown a step-down transformer TI, a timer T. Timer T turns off power magnetic starter MS, by de-energizing coil C, and after a preselected interval turns off reversing switch RS by de-energizing coil CA. After a further selected interval, reversing switch RS makes contacts CT engage which reverses positive and negative leads of pulsating direct current by energizing coil CB of reversing switch RS. After a further selected interval, the timer turns on magnetic starter MS by energizing coil C. The magnetic starter passes alternating current to the primary side of the transformer TI, and the secondary side thereof supplies low voltage, high amperage current to diodes D, which supply pulsating direct current to plates P–1 and P–2.

In regard to the diodes, any conventional diodes may be used such as a rectifier tube, a selenium rectifier or a silicon control rectifier diode or a solid state diode. Many of such devices are well known in the art.

Referring to FIG. 4, the overall process is shown. In Step 1 the ore is prepared according to the particular leaching process contemplated and according to the ore to be used; the ore is then leached in Step 2 and the pregnant leach liquor is sent to the electrolytic cell, Step 3, where the copper is precipitated and the leach liquor sent to a holding vessel, Step 4. The leach liquor from the holding vessel may be recirculated again through the electrolytic cell for further removal of copper or sent to the leaching step for dissolving further copper from fresh ore or for further dissolving copper from the already leached ore. Of course, a combination of the above may be accomplished if desired. The copper removed from Step 3 is washed and dried, if desired, and packaged for market.

The frequency of the pulsating direct current may vary over a wide range, from as low as about 600 pulses per minute or lower to as high as about 3 million pulses per minute or higher. The preferred range, however, is between 3000 and 4200 pulses per minute.

According to a further feature of the present invention, it has been found that the efficiency of the electrolytic precipitation and ease of the precipitated copper falling from the electrode plate upon revising the current is improved if a minor amount of lead is dissolved in the pregnant leach liquor. Conveniently the lead is dissolved in the leach liquor in the form of a salt; an especially convenient form is that of lead sulfate. The amount of lead dissolved may be quite low, and may range from about 0.10% to as high as about 5%. The optimum amount of lead may be easily determined for any particular conditions by slowly increasing the concentration thereof until absolutely no copper sticks to the electrode plates when the current is reversed.

The following examples illustrate the invention, but it is to be understood that the invention is limited only by the appended claims. All proportions and percents in the examples are expressed by weight unless otherwise specified.

EXAMPLE 1

A copper ore consisting of mixed oxides and sulfides in which the total copper of the ore was about 1.2% by weight was crushed and washed. The ore was transferred into a cement leaching tank wherein leaching liquor, containing 125 g./l. of sulfuric acid and about 6 g./l. of ferric sulfate, was percolated up through the ore at a rate whereby the leaching liquor contained about 35 g./l. of dissolved copper when it reached the top of the leaching tank. The pregnant liquor was drawn off the top of the tank and continuously flowed into a setting tank where the suspended insolubles were allowed to settle as the pregnant liquor slowly flowed through the tank. The pregnant liquor was then filtered to further remove suspended solids. After filtering, the pregnant liquid was heated to about 40° C. and flowed into an electrolytic precipitating cell as shown in FIG. 1 with 316 stainless steel electrodes. A pulsating direct current was supplied to the cell at 2.75 volts and at a current density of 30 amps./ft. with 3600 pulses per minute. The pregnant liquor was continually recirculated out of and back into the cell. After two hours of operation, the cathode had a thick coating of copper adhered thereto. The polarity of the electrodes was reversed and copper began to precipitate on the previous anode (now a cathode) and the copper deposited on the previous cathode (now an anode) began to fall off. After a further two hours of operation the previous cathode (now the anode) was almost completely clean with only very minor amounts of copper remaining adhered to the plate. The copper which had fallen to the bottom of the cell was removed and various samples were analyzed. The sample averaged at least 97% pure copper.

EXAMPLE 2

The procedure of Example 1 was repeated on a different sample of ore known to be contaminated with many minerals. The polarity of the electrodes was reversed every 1½ hours in a continuous operation for 30 days. Periodically, the copper which had fallen to the bottom of the cell was removed and fresh pregnant liquor was blended with the liquor being recirculated, while part of the liquor withdrawn from the cell was recycled to the leaching tank. After the 30 days operation the electrodes showed only a slight accumulation of precipitated copper. Many samples were removed from the cell during operation and later combined into one sample with blending. A spectrographic analysis of the combined samples is shown in Table I. Note that the present invention is capable of recovering a wide variety of elements from mixed ores, which elements may be separated in known ways if desired.

TABLE I

| Element: | Percent by weight |
|---|---|
| Copper | 86 |
| Silicon | 1.6 |
| Chromium | 0.12 |
| Iron | 0.19 |
| Auminum | 0.12 |
| Barium | 0.15 |
| Manganese | 0.016 |
| Lead | 1.9 |
| Magnesium | 0.070 |
| Tin | 0.019 |
| Nickel | 0.012 |
| Bismuth | 0.015 |
| Titanium | 0.010 |
| Silver | 0.00083 |
| Strontium | 0.010 |
| Calcium | 0.030 |
| Antimony, not detected | <0.008 |
| Arsenic, not detected | <0.04 |
| Beryllium, not detected | <0.00006 |
| Boron, not detected | <0.002 |
| Cadmium, not detected | <0.02 |
| Cesium, not detected | <0.20 |
| Cobalt, not detected | <0.0005 |
| Columbium, not detected | <0.02 |
| Galium, not detected | <0.004 |
| Germanium, not detected | <0.003 |
| Gold, not detected | <0.003 |
| Hafnium, not detected | <0.05 |
| Indium, not detected | <0.02 |
| Lithium, not detected | <0.04 |
| Mercury, not detected | <0.05 |
| Molybdenum, not detected | <0.001 |
| Platinum, not detected | <0.004 |
| Phosphorus, not detected | <0.03 |
| Rhenium, not detected | <0.005 |
| Rutheinum, not detected | <0.006 |
| Rubidium, not detected | <0.20 |
| Sodium, not detected | <0.04 |
| Tantalum, not detected | <0.10 |
| Tellurium, not detected | <0.06 |
| Thallium, not detected | <0.07 |
| Tungsten, not detected | <0.04 |
| Vanadium, not detected | <0.001 |
| Zinc, not detected | <0.002 |
| Zirconium, not detected | <0.003 |
| Rare earths, nil. | |

EXAMPLE 3

The procedure of Example 2 was repeated with the ore of Example 1 except that .1% of lead sulfate was added to the pregnant liquor prior to entry into the electrolytic cell. After 30 days operation, the electrodes had only traces of copper remaining thereon.

EXAMPLE 4

The procedure of Example 1 was repeated under the conditions shown below and with the noted results.

| Test No. | Voltage, v | Current density, amps/ft.$^2$ | D.C. Pulses per minute | Amount of copper remaining on previous cathode |
|---|---|---|---|---|
| 1 | 1.00 | 30 | 2900 | Trace. |
| 2 | 1.25 | 30 | 3000 | Do. |
| 3 | 1.75 | 30 | 3600 | None. |
| 4 | 2.50 | 34 | 3200 | Trace. |
| 5 | 3.50 | 27 | 3300 | Do. |
| 6 | 4.25 | 35 | 3400 | Do. |
| 7 | 4.75 | 30 | 3600 | None. |
| 8 | 5.50 | 31 | 3800 | Trace. |
| 9 | 6.25 | 30 | 4200 | Do. |
| 10 | 7.00 | 28 | 6000 | Slight. |

EXAMPLE 5

The procedure of Example 4 was repeated except that 1.5% lead sulfate was added to the pregnant liquor. In all tests except 9 and 10 no copper remained on the previous cathode. In Tests 9 and 10 trace amounts remained.

EXAMPLE 6

The procedure of Example 1 was repeated except that the current density was varied from 10 amps/sq. ft. to 60 amps/sq. ft. in 10 amps/sq. ft. increments. Only trace amounts of copper remained on the previous cathode except at the 50 and 60 amps/sq. ft. test where traces remained and at the 30 amps/sq. ft. test where no copper remained.

EXAMPLE 7

The procedure of Example 6 was repeated five times except that lead sulfate was added to the pregnant liquor in amounts of .1%, 1%, 3%, 5%, and 7%, respectively in each test. No copper remained on the previous cathode in any of the tests except where the current density was 50 and 60 amps/sq. ft. where only trace or slight trace amounts remained.

From the above examples, it can be seen that the objects of the invention have been accomplished. Also, from the above, it will be apparent to one skilled in the art that the present invention is equally applicable to electrorefining processes. For example, a conventional copper starter sheet may be formed in a conventional way and used as the anode. After the starter sheet has been dissolved and precipitated on the cathode, according to the process of the present invention, a stainless steel type plate may be inserted in the cell and function as a new cathode with the previous cathode, having the refined copper precipitated thereon, functioning as the anode. During the subsequent operation of the process, the refined copper will drop to the bottom of the tank.

As is apparent from the above disclosure, the present invention is applicable to extracting copper from any copper containing material, from which the copper can be electrolytically precipictated, and many variations of the above disclosures will be readily apparent to one skilled in the art. Therefore, the present invention is to include such apparent variations and is limited only by the scope and spirit of the following claims.

What is claimed is:

1. In a process for extracting copper from ores wherein the copper is dissolved in a liquor and recovered from the liquor by electrolytic precipitation in a cell having at least one anode and at least one cathode, the improvement comprising electrodepositing the copper on the cathode by supplying to the anode and cathode a pulsating direct current and then causing precipitation of the electrodeposited copper from said cathode by periodically reversing the polarity of the anode and cathode whereby the previously functioning anode becomes the cathode and the previously function cathode becomes the anode.

2. The process of claim 1 wherein the pulsating direct current pulses from 600 to 3 million times per minute, and the current density of the current on the anode and cathode is from 10 to 60 amps per square foot.

3. The process of claim 2 wherein the current density of the anode and cathode is from 20 to 40 amps per square foot, the voltage is from 2.75 to 4.5 volts, and the number of pulses is from 3000 to 4200 pulses per minute.

4. The process of claim 1 wherein the liquor contains sulfuric acid and from .1% to 5% of lead sulfate by weight of the liquor.

5. The process of claim 1 wherein the electrodes are made of a stainless steel type material.

6. The process of claim 5 wherein the stainless steel type material is 316 stainless steel.

References Cited

FOREIGN PATENTS 1,412,438  8/1965  France.
12,159  1963  Japan.

HOWARD S. WILIAMS, Primary Examiner

R. L. ANDREWS, Assistant Examiner

U.S. Cl .X.R.

204—10